United States Patent
Le Neindre et al.

(10) Patent No.: US 8,142,327 B2
(45) Date of Patent: Mar. 27, 2012

(54) METHOD FOR CONTROLLING THE COUPLING AND THE DECOUPLING OF TWO MOTORS OF A PARALLEL HYBRID MOTIVE POWER GROUP

(75) Inventors: Yvan Le Neindre, Paris (FR); Gaetan Rocq, La Boissiere-Ecole (FR)

(73) Assignee: Peugeot Citroen Automobiles SA, Velizy Villacoublay (FR)

(*) Notice: Subject to any disclaimer, the term of this patent is extended or adjusted under 35 U.S.C. 154(b) by 1130 days.

(21) Appl. No.: 11/993,855

(22) PCT Filed: Jun. 23, 2006

(86) PCT No.: PCT/FR2006/050628
§ 371 (c)(1),
(2), (4) Date: Dec. 21, 2007

(87) PCT Pub. No.: WO2007/000554
PCT Pub. Date: Jan. 4, 2007

(65) Prior Publication Data
US 2010/0087289 A1    Apr. 8, 2010

(30) Foreign Application Priority Data
Jun. 27, 2005   (FR) ...................................... 05 06515

(51) Int. Cl.
*B60W 10/02* (2006.01)
*B60W 20/00* (2006.01)
*G06F 19/00* (2011.01)
*H02K 7/108* (2006.01)

(52) U.S. Cl. .................... 477/6; 180/65.25; 180/65.275; 477/5; 701/22

(58) Field of Classification Search ............. 180/65.275, 180/65.285, 65.21, 65.25; 475/5, 6, 8; 477/6, 477/167, 171, 180, 181; 701/22, 67
See application file for complete search history.

(56) References Cited

U.S. PATENT DOCUMENTS 6,315,068 B1   11/2001   Hoshiya et al.
(Continued)

FOREIGN PATENT DOCUMENTS
EP    0940287 A    9/1999
(Continued)

OTHER PUBLICATIONS

International Search Report mailed Apr. 5, 2007 in PCT/FR2006/050628.

*Primary Examiner* — J. Allen Shriver, II
*Assistant Examiner* — Bridget Avery
(74) *Attorney, Agent, or Firm* — Nicolas E. Seckel

(57) ABSTRACT

According to this method for controlling the coupling and the decoupling of the first and second motors of a parallel hybrid motive power group comprising a first motor driving an input shaft, a second motor, and a coupling/decoupling means motors, maneuverable between an open position and a closed position, the motive power group is controlled so that the rotational speed of the input shaft at the moment of coupling and of decoupling remains unchanged while using a law of control that creates a discontinuity between the torques output to the input shaft when the first and the second motors are decoupled or coupled, selected for compensating for the difference between the inertias produced by the input shaft when the first and the second motors are decoupled or coupled in order to ensure a continuity of the acceleration of the input shaft when coupling or decoupling.

11 Claims, 3 Drawing Sheets

U.S. PATENT DOCUMENTS

Figure 1:
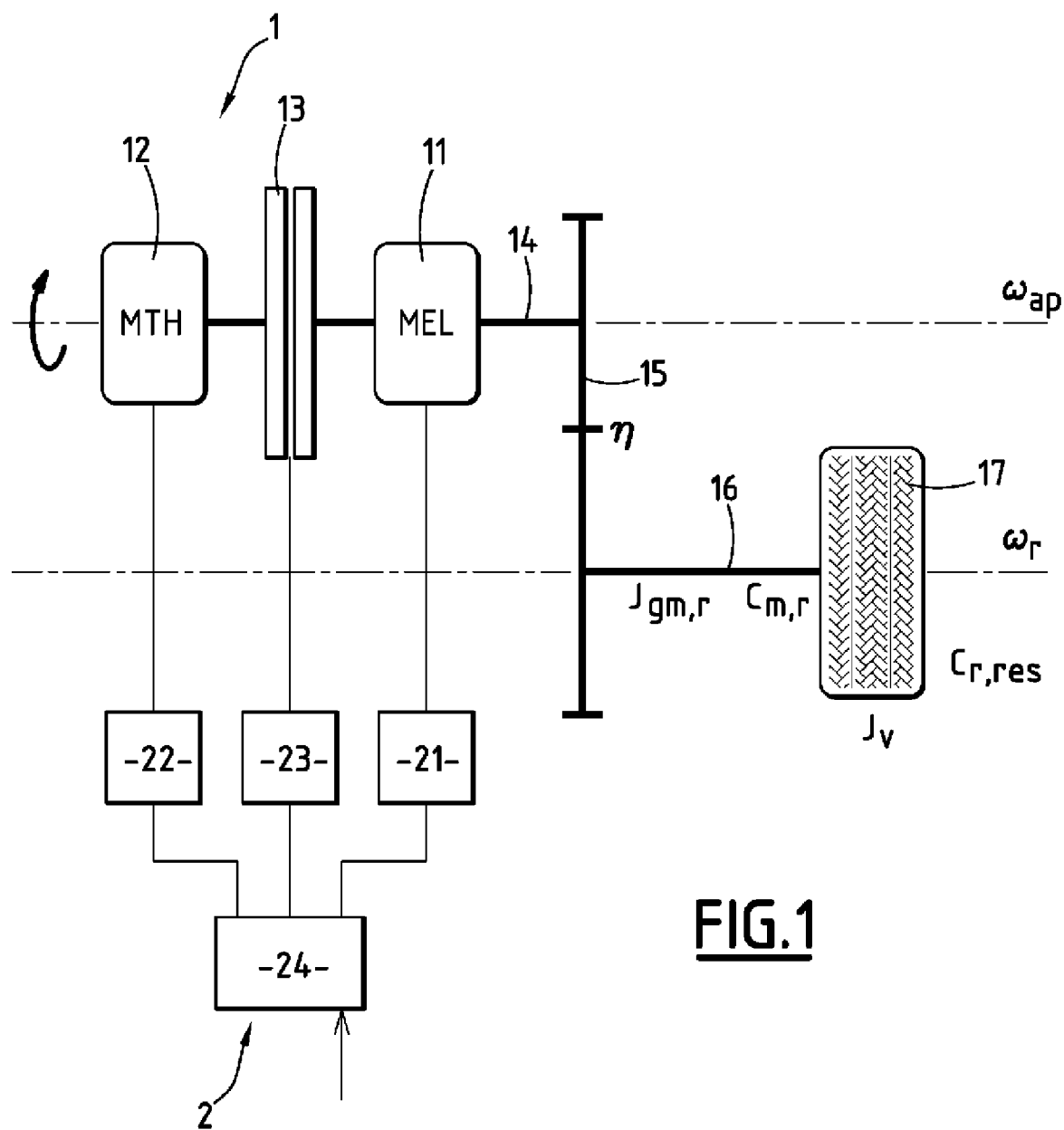

| | | |
|---|---|---|
| 6,449,546 B1 * | 9/2002 | Sakamoto et al. ............ 701/51 |
| 6,505,109 B1 | 1/2003 | Strandell et al. |
| 6,622,805 B2 * | 9/2003 | Nakashima ............ 180/65.25 |
| 2003/0004031 A1 | 1/2003 | Philips et al. |
| 2005/0029023 A1 | 2/2005 | Takami et al. |

FOREIGN PATENT DOCUMENTS

| | | | |
|---|---|---|---|
| JP | 2000255285 A | * | 9/2000 |
| JP | 2003252082 A | * | 9/2003 |

* cited by examiner

METHOD FOR CONTROLLING THE COUPLING AND THE DECOUPLING OF TWO MOTORS OF A PARALLEL HYBRID MOTIVE POWER GROUP

The present invention relates to controlling the coupling and the decoupling of the first motor and the second motor of a parallel hybrid drive train, and of a parallel hybrid drive train, for example, comprising a first electric motor and a second heat engine that can be coupled via a controlled clutch, and which are intended to drive a motor vehicle.

Motor vehicles equipped with a parallel hybrid drive train are known. Parallel hybrid drive trains are drive trains that include a first motor that is generally electric and a second motor that is generally a heat engine, that can be coupled or decoupled via a controlled clutch so as to continuously optimize the use of the various energies available.

Depending on the vehicle operating conditions, the electric motor is used either alone or coupled with the heat engine, in which case the electric motor can also operate in energy collection mode. The coupling/uncoupling of the heat engine and the electric motor is achieved using the controlled clutch. This assembly is controlled by control units, or more generally, computer systems dedicated to each of the components—heat engine, clutch, and electric motor—supervised by a main computer that determines the optimal operating mode of the drive train according to the vehicle operating conditions.

When the supervising computer gives an instruction to change from a state where only the electric motor is being used to a state where the electric motor is coupled to the heat engine or the reverse, the dedicated control units for the components govern the coupling or decoupling of the heat engine and the electric motor under the most satisfactory conditions for the operation of the vehicle.

In particular, coupling and decoupling are carried out in conditions such that, at the moment the clutch closes or just before it opens, the electric motor and the heat engine are rotating at the same speed, and also such that there is continuity in the drive torque of the main shaft through which the drive train drives the gearbox.

Controlling these transitional phases for starting or coupling the heat engine and the electric motor is particularly important in a hybrid drive train, since these operating mode changes can occur more than 200 times per driving hour, regardless of the vehicle speed or the gear engaged.

These transitional coupling and uncoupling phases must be as transparent as possible for the driver of the vehicle, so that the response time during an acceleration is minimal, the level of acceleration is consistent with the driver's wish, longitudinal comfort is maximized, and acoustic comfort is also maximized, in particular by avoiding engine overrevving and starting noises. However, it has been observed that the strategy used to couple or uncouple the heat engine and the electric motor, which consists in keeping the drive torque of the main shaft constant, generates significant disturbances to the comfort during starting phases; in particular, significant impacts can be felt especially on the first gear ratios of the gearbox.

The purpose of the present invention is to remedy this difficulty by proposing conditions for controlling the coupling or the decoupling of a heat engine and an electric motor of a parallel hybrid drive train, such that it does not generate impacts—or more generally, annoyances—at the moment these operating mode changes occur.

To this end, the object of the invention is a method for controlling the coupling or the decoupling of the first motor and the second motor of a parallel hybrid drive train of the type that comprises a first motor that drives a main shaft, a second motor, and a coupling/decoupling means for the second motor and the first motor, maneuverable between an open position and a closed position, according to which the drive train is controlled so that the rotation speed of the main shaft remains unchanged at the moment of coupling and decoupling, characterized in that a control law is used to control the drive train that generates a discontinuity between the torque Cap,d delivered to the main shaft when the first and second motors are decoupled and the torque Cap,c delivered to the main shaft when the first and second motors are coupled, which is selected so as to offset the difference between the inertia Jap,d carried by the main shaft when the first and second motors are decoupled and the inertia Jap,c carried by the main shaft when the first and second motors are coupled in order to maintain a continuity in the acceleration of the main shaft driven by the motor at the moment of coupling or decoupling.

If the main shaft of the drive train is subjected to a resisting torque Cap,res, then the torque discontinuity $\Delta C = Cap,c - Cap,d$ generated is such that $$\frac{Cap, c - Cap, res}{Jap, c} = \frac{Cap, d - Cap, res}{Jap, d}$$

Thus:

$$\Delta C = \frac{Jap, c - Jap, d}{Jap, d}(Cap, d - Cap, res)$$

We can define a torque setpoint Cap,c,v for the main shaft when the motors are coupled, targeted after coupling or decoupling, and a torque setpoint Cap,d,v for the main shaft when the motors are decoupled, targeted after coupling or decoupling, such that:

$$\frac{Cap, c, v - Cap, res}{Jap, c} = \frac{Cap, d, v - Cap, res}{Jap, d}$$

and the drive train is controlled so that, after the coupling/decoupling means maneuver, the torque delivered to the main shaft is equal to the target torque setpoint Cap,c,v or Cap,d,v for the main shaft that corresponds to the state—coupled or decoupled, respectively—of the coupling/decoupling device at the end of its maneuver.

When the drive train is being controlled to couple the first motor and the second motor, a sudden discontinuity can be generated in the torque setpoint Cap,v(t) for the main shaft, which is targeted at each instant, that is equal to the difference between the main shaft torque setpoint Cap,d,v when the motors are decoupled and the main shaft torque setpoint Cap,c,v when the motors are coupled.

The sudden discontinuity in the torque setpoint Cap,v(t) for the main shaft, which is targeted at each instant, is preferably generated at the instant when the coupling/decoupling device reaches the closed position.

For example, the coupling/decoupling device can be commanded to change from the open position to the closed position: starting at the beginning of the period in which the coupling/decoupling device is closing, we control the first motor for torque so that at each instant the sum of the setpoint Cmot1(t) for torque provided by the first motor and the setpoint Cemb(t) for torque delivered by the coupling/decoupling device is equal to the setpoint Cap,v(t) targeted at each instant for the torque delivered by the main shaft, thus: Cap,v(t)=Cmot1(t)+Cemb(t); during the period when the coupling/decoupling device is closing, we control the second motor for speed, so that at the moment the device closes, its speed is substantially equal to the rotation speed of the main shaft; and from the instant the coupling/decoupling device closes, we control the second motor for torque with a setpoint Cmot2,v(t) equal to the sum of the setpoint Cemb(t) for torque delivered by the clutch and the difference between the post- and pre-coupling target torque setpoints for the main shaft, thus:

$$Cmot2,v(t)=Cemb(t)+Cap,c,v-Cap,d,v$$

This is valid until the instant the clutch bites, which is also the synchronization point, because after that, a complete closure setpoint is sent to the clutch in order to prevent it from sliding again at the wrong time.

A coupling time Tempo can be defined, as well as an optimal torque setpoint for the second motor Cmot2,op, and we control the closing of the coupling/decoupling device so that the setpoint Cemb(t) for torque delivered by the coupling/decoupling device varies linearly over time, so that at the end of a time equal to Tempo after the moment when actuation of the coupling/decoupling means begins, the setpoint for torque delivered by the second motor is equal to the optimal torque setpoint Cmot2,op for the second motor.

When controlling the decoupling of the second motor, before the coupling/decoupling means begins to open, the second motor can be controlled so that the setpoint Cmot2,d for torque delivered by the second motor just before the instant the device begins to open is equal to the difference between the target torque setpoint Cap,c,v for the main shaft if it were not decoupled and the setpoint Cap,d,v for torque delivered by the main shaft after decoupling; and the first motor can be controlled for torque so that the setpoint Cmot1,v(t1) for torque delivered by the first motor at the moment the coupling/decoupling means begins to open is equal to the post-decoupling target torque setpoint Cap,d,v of the main shaft, and so that throughout decoupling, the sum of the setpoints for torque delivered by the first motor at each instant Cmot1,v(t) and the second motor at each instant Cmot2,v(t) is equal to the setpoint Cap,c,v for torque delivered to the main shaft when the motors are coupled. Then, between the instant the device begins opening and the instant it finishes opening, the coupling/decoupling means is suddenly opened so that from the instant it finishes opening—which is when the coupling/decoupling means is completely open—the torque transmitted to the main shaft is equal to the torque Cap,d,v targeted after decoupling.

The first motor is an electric motor, for example; the second motor is a heat engine, for example; the coupling/decoupling means is a controlled clutch, for example; and the drive train is the drive train of an automobile, for example.

The invention also concerns a parallel hybrid drive train for propelling an automobile, including a first motor, a second motor, a coupling/decoupling means for the first motor and the second motor, and a control means that implements the method according to the invention in order to control the coupling or the decoupling of the two motors.

The control means preferably includes at least one computer and the control method is implemented using an appropriate computer program.

Figure 2:
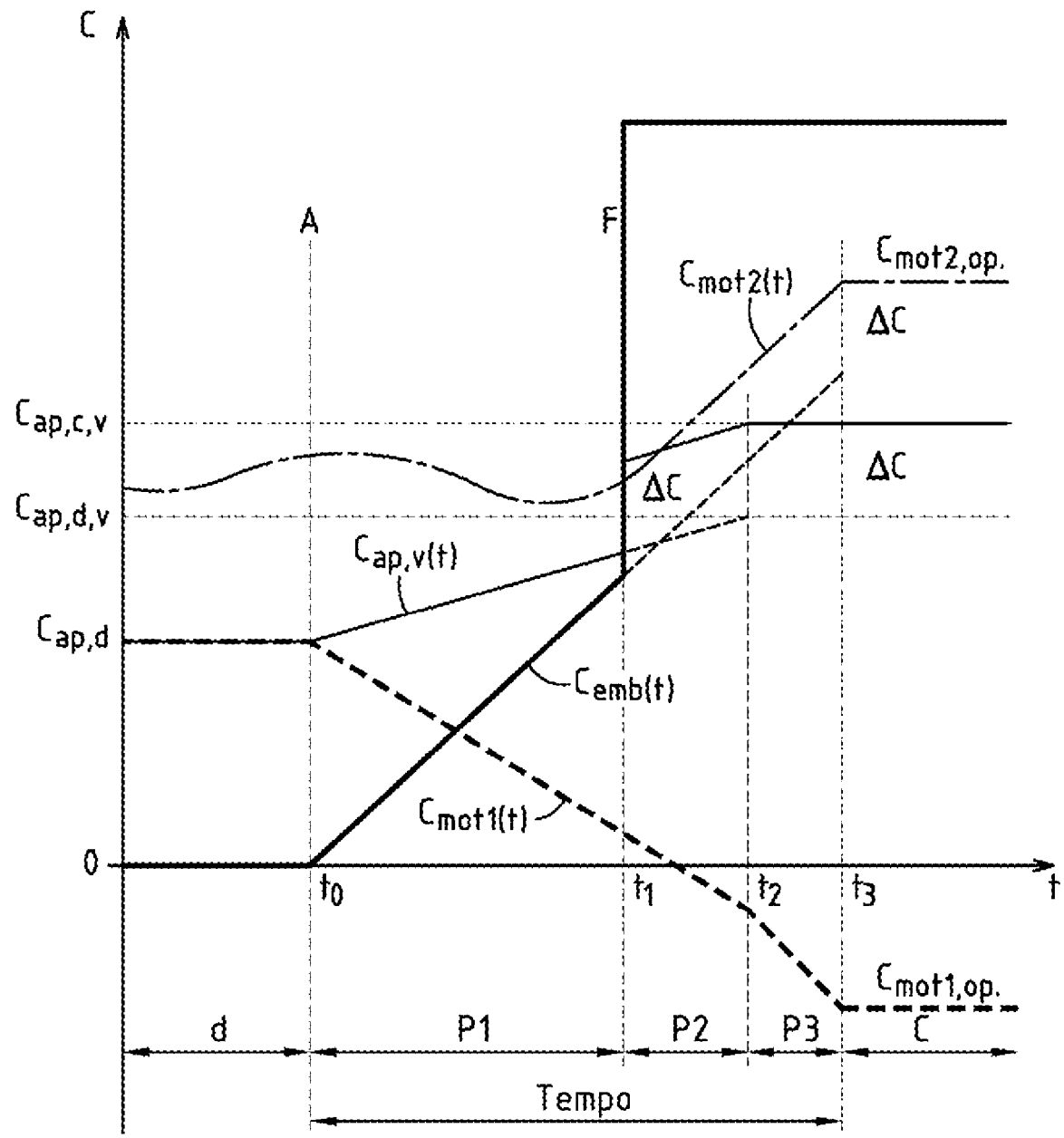

The invention will now be described more precisely, but not exhaustively, with reference to the annexed figures, in which:

FIG. 1 schematically represents a parallel-mode simple hybrid fraction drive for the wheel of a motor vehicle;

FIG. 2 schematically represents the control laws used for coupling the heat engine to the electric motor in a parallel hybrid drive train.

Figure 3:
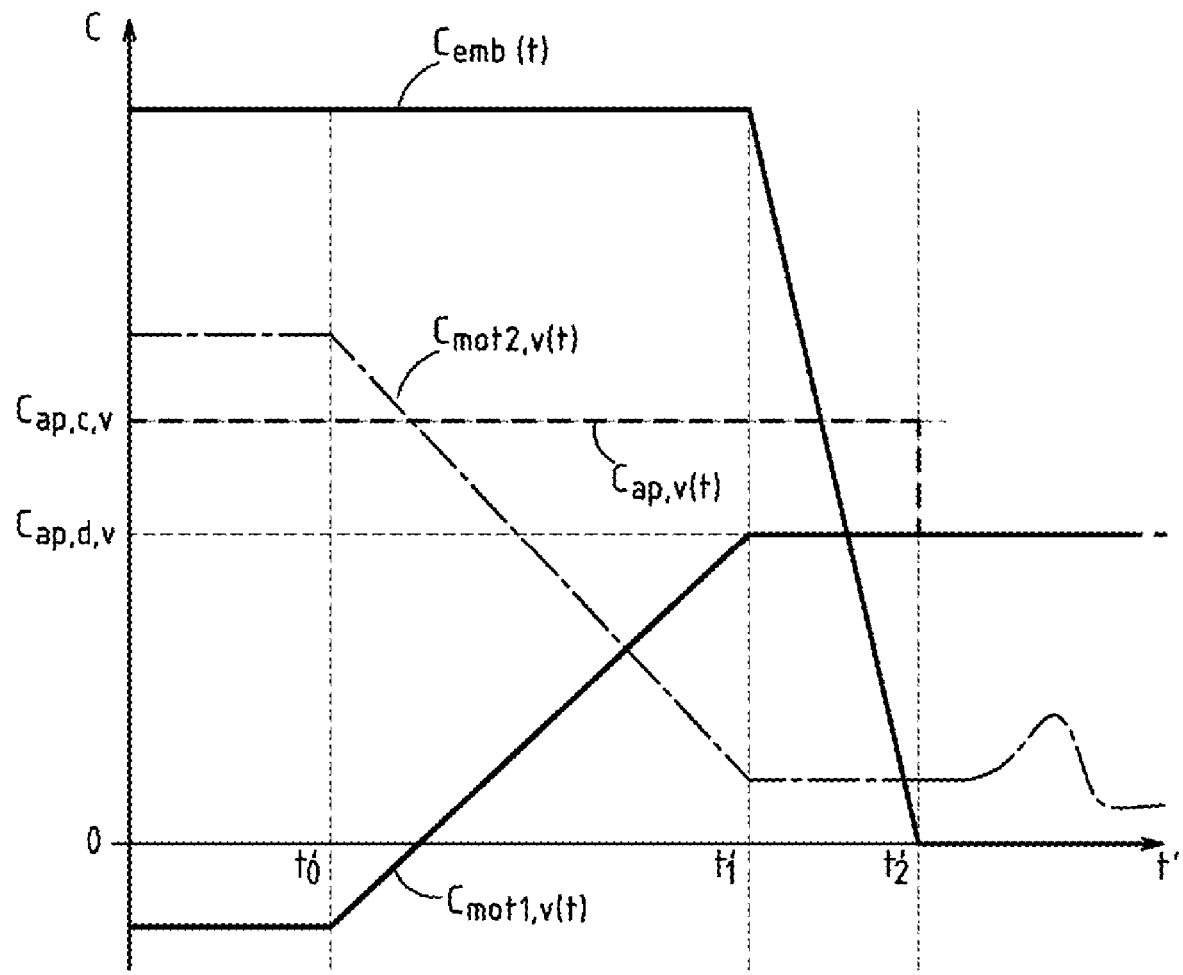

FIG. 3 schematically represents the control law used for decoupling the heat engine and the electric motor of a parallel hybrid drive train.

We will discuss the hybrid traction drive represented in FIG. 1. This hybrid traction drive includes a drive train, generally referenced 1, made up of a first motor 11, which is an electric motor, or more generally, an electrical machine that can operate as a generator as well as a motor, and a second motor 12, which is a heat engine, with the two motors—electric and heat engine—able to be coupled via a coupling/decoupling means 13, which is generally a controlled clutch.

This drive train is controlled by a control means, generally referenced 2, made up of a local computer 21 for controlling the first motor 11, a second local computer 22 for controlling the second motor 12, a third local computer 23 for controlling the coupling/decoupling means 13, and a supervising computer 24 responsible for giving instructions to the local computers 21, 22 and 23.

The computer 24 receives information and instructions from various sensors located on the vehicle, in a manner known in itself to the person skilled in the art.

The drive train 1 drives a main shaft 14, which is the input shaft of a gearbox 15, which drives an output shaft 16, which drives at least one wheel 17 of the vehicle.

In operation, the wheel 17 is subjected to a resisting torque as well as a motor torque, which is the drive torque of the output shaft 16, and the acceleration of the mechanical assembly is equal to the ratio of the difference between the motor torque and the resisting torque divided by the moment of inertia seen by the mechanical system, i.e., by the sum of the moments of inertia of the driven masses with respect to the axle 16.

If $C_r$,res is the resisting torque seen by the wheel drive shaft 16, $J_v$ is the modulus of inertia of the vehicle seen by the wheel drive shaft 16, $C_m$,r is the motor torque seen by the wheel drive shaft 16, $J_m$,r is the modulus of inertia of the entire drive unit seen by the wheel drive shaft 16, and lastly, $\omega_r$ is the angular speed of the wheel, then we have $(J_v+Jm,r)\times d\omega_r/dt=C_m,r-C_r,res$.

This fundamental equation of dynamics can be written with reference to the main input shaft 14 to the gearbox. This main shaft rotates at an angular speed $\omega_{ap}=\omega_r/\eta$, $\eta$ being the gearbox ratio.

The main shaft sees a resisting torque Cap,res=$\eta \times$Cr,res, and a vehicle drive inertia Jap,v=$\eta^2 \times$Jv. In addition, it sees an inertia Jap,m corresponding to the drive unit.

The main shaft 14 is subjected to a drive torque Cap that corresponds to the sum of the torque transmitted to it by the first motor and the torque optionally transmitted to it by the second motor through the coupling and decoupling means.

Using this notation, we have:

$$(Jap,m+Jap,v)d\omega ap/dt=Cap,m-Cap,res.$$

The inventors have observed that the inertia actually carried by the main shaft varies according to whether the first motor and the second motor are coupled or decoupled.

When only the first motor is coupled, the main shaft drives only the inertia of the first motor.

Conversely, when both motors are coupled and rotating at the same speed, the main shaft 14 is driving masses whose inertia corresponds to the sum of the inertias of the first motor and the second motor.

The inventors discovered that the longitudinal impact felt at the moment the coupling/decoupling means suddenly closes or opens when coupling or decoupling is carried out at a constant torque was due to the difference between the inertias carried when the motors are coupled versus when they are decoupled.

The inventors also newly discovered that the effect of the impact could be eliminated with a discontinuity in the main shaft drive torque at the moment the coupling/decoupling means suddenly closes or opens.

That is, again using the notation given above, the acceleration of the main shaft 14 dωap/dt is equal to the difference between the drive torque of this main shaft and the resisting torque to which it is subjected, divided by the inertia that this main shaft must drive. For the acceleration of the main shaft to be the same before coupling and after coupling, it is necessary that:

$$(Cap,c-Cap,res)/Jap,c=(Cap,d-Cap,res)/Jap,d.$$

Since the moments of inertia Jap,c and Jap,d are different, we are led to introduce a discontinuity in the drive torque of the main shaft 14 at the moment we couple the two motors or at the moment we decouple them.

To create this discontinuity in the drive torque of the main shaft 14 at the moment the motors are coupling or decoupling, we have the control system 2 implement a control law precisely formulated to generate such a discontinuity at the most appropriate moment for preventing discontinuities in the acceleration of the vehicle.

In order to accomplish this, based on the resisting torque Cap,res to which the main shaft is subjected, which is calculated using methods known in themselves that correspond to the basic components of the motor vehicle, we define two torque setpoints for the main shaft, one of which is targeted when the first and second motors are coupled, and the other when these two motors are decoupled. We will call these setpoints $C_{ap},c,v$ and $C_{ap},d,v$, respectively.

Then it is a matter of making the torque to which the main shaft is subjected change from the value it has before coupling or decoupling begins to the value targeted after coupling or decoupling, while generating a discontinuity at the opportune moment, such that:

$$\Delta C=Cap,c,v-Cap,d,v.$$

In order to make the torque transmitted to the main shaft change from the value it has before coupling or decoupling to the value targeted after coupling or decoupling, we control the two motors and the coupling decoupling means by making them follow control laws that will now be described, distinguishing between the two cases: the coupling versus the decoupling of the two motors. The control laws to be applied are in fact not the same in the two cases.

In all cases, the first motor is controlled for torque, which means that for the local computer that controls it, at each instant we define a torque setpoint to be followed.

The second motor is controlled only for speed when it is decoupled, and for torque when it is coupled.

The coupling/decoupling means is controlled for torque, and it changes from an open to a closed position. The beginning of the transition from the open to the closed position is called synchronization. When the coupling/decoupling means is open, its transmittable torque is zero. When it is closed, its transmittable torque is maximized. Between these two positions, the degree to which the coupling/decoupling means closes is adjusted according to the torque setpoint so that, at each instant, the maximum transmittable torque is equal to the corresponding torque setpoint.

The setpoints for the various components can be variable over time; for example, they can follow a ramp defined to change linearly from a first value at an initial instant to a second value at a final instant. The setpoints can also be constant over a given time interval, or can suddenly jump in value at a given instant.

We will now define the control law for coupling, with reference to FIG. 2.

As seen in FIG. 2, we have a succession of periods, and events separating the periods. In succession we have:

the initial state, which is the period referenced d, during which the second motor is decoupled. During this period, at an instant not shown in the figure, the supervising computer 24 of the drive unit decides to couple the two motors and to give each motor an optimal torque setpoint to reach after coupling: Cmot1,*op* and Cmot2,*op*, respectively. During this period, the coupling/decoupling means is completely open and is transmitting no torque.

instant $t_0$, at which the process of closing the coupling/decoupling means begins, and which corresponds to the beginning of torque re-engagement. At this instant the torque transmittable by decoupling/decoupling means is zero.

the closure period, referenced P1, during which the coupling/decoupling means is progressively closed. During this period, the coupling/decoupling means is controlled for torque so as to progressively increase the maximum transmittable torque.

instant t1, which corresponds to the end of the process of closing the coupling/decoupling means. From this instant t1 on, the two motors are synchronized, which means that the torque of the second motor is integrally transmitted to the main shaft, whose drive torque is then equal to the sum of the torques provided by the two motors.

the period referenced P2, during which the setpoint for the main shaft drive torque is adjusted to reach the post-coupling target value Cap,c,v. This period lasts until instant t2, at which time the setpoint for the main shaft drive torque remains constant from then on.

period P3, ending at instant t3, during which the torque setpoints of the motors are adjusted to reach their optimal values at instant t3.

the period referenced C, which corresponds to the final state, in which the two motors are coupled.

We will now describe how the coupling process is carried out.

First of all, during the period d, when the supervising computer 24 decides to couple the two motors, it defines:

the instant t3 after which the motors must be coupled, with their optimal operating conditions.

the optimal torque setpoints for the second motor Cmot2,*op* and for the first motor Cmot1,*op*, as well as the target torque for the main shaft when the motors are coupled Cap,c,v.

the instant t0 at which the coupling/decoupling means begins to close, which takes into account a time delay Tempo that lasts longer than the time it takes the coupling/decoupling means to close, such that:

$$t0=t3-\text{Tempo}$$

a torque setpoint that would be targeted for the main shaft if the motors were decoupled Cap,d,v, which takes into account the estimated resisting torque Cap,res to which the main shaft is subjected. This torque Cap,d,v is equal to the difference between the target torque for the main shaft when the motors are coupled Cap,c,v and the jump in torque Δc needed to ensure continuous acceleration at the moment the coupling/decoupling means closes. Thus:

$$Cap, d, v = Cap, c, v - \Delta C$$

With:

$$\Delta C = \frac{Jap, c - Jap, d}{Jap, c}(Cap, c, v - Cap, res)$$

Jap,c and Jap,d are the moments of inertia of the masses driven by the main shaft when the motors are coupled and decoupled, respectively.

If Jr,veh is the moment of inertia corresponding to the vehicle, with respect to the output shaft of the gearbox, if η is the gearbox ratio, if Jap,mot1 and Jap,mot2 are the moments of inertia of the first and second motors, respectively, with respect to the main shaft, then we have:

$$Jap,d=Jap,mot1+\eta^2 J_r,veh$$

and $$Jap,c=Jap,d+Jap,mot2.$$

During this preliminary period in which setpoints are defined, the second motor is controlled for speed, i.e. for rotation speed, so that at instant t0, its rotation speed is greater than the rotation speed of the main shaft.

The supervising computer 24 then gives instructions to the local computers 21, 22 and 23 to start the coupling process at instant t0.

Starting at instant t0, the computer 23 controlling the coupling/decoupling means transmits a torque setpoint Cemb(t) to this means, following a ramp such that, at instant t3, the sum of this setpoint and the jump in torque setpoint for the main shaft ΔC is equal to the optimal torque setpoint for the second motor, thus:

$$Cemb(t3)+\Delta C=Cmot2,op$$

Simultaneously, using the control computer 21 for the first motor, we send the first motor a torque setpoint Cmot1(t) such that the sum of the torque setpoint for the first motor and the setpoint for torque transmitted by the coupling/decoupling means is equal to the target torque setpoint for the main shaft Cap,v(t).

Before the instant t1 when the coupling/decoupling means closes—i.e., during the period P1—the setpoint for torque transmitted by the coupling/decoupling means is equal to the torque setpoint for this means Cemb(t). Thus, we have:

$$Cmot1(t)+Cemb(t)=Cap,v(t).$$

During this period, the second motor is controlled for rotation speed in such a way that its rotation speed at instant t1 when the coupling/decoupling means closes is equal to the rotation speed of the main shaft.

After closure at instant t1—i.e., during the period P2—the second motor is controlled for torque, and the torque transmitted by the coupling/decoupling means is equal to the torque provided by the second motor. The result is that the torque setpoint for the main shaft becomes equal to the sum of the torque setpoints for the two motors, that is:

$$Cap,v(t)=Cmot1(t)+Cmot2(t).$$

The torque setpoint Cmot2(t) for the second motor follows a ramp parallel to the torque setpoint ramp for the coupling/decoupling means Cemb(t), which is offset with respect to this latter ramp by the value of the main shaft torque setpoint jump ΔC, so that at instant t3, the torque setpoint for the second motor is equal to the optimal torque setpoint for the second motor.

Due to these various control laws for the various components of the drive unit, the torque setpoint targeted at each instant for the main shaft Cap,v(t) follows a first ramp during period P1, starting from the torque value before coupling Cap,d, and at instant t2, after the coupling/decoupling means closes, it reaches the target setpoint for the decoupled main shaft Cap,d,v.

At the instant t1 when the coupling/decoupling means closes, the torque setpoint for the main shaft Cap,v(t) makes a sudden jump equal to ΔC. This sudden jump makes it possible to absorb the concomitant jump taking place in the moment of inertia.

After this instant t1 and throughout the period P2, the torque setpoint for the main shaft Cap,v(t) follows a law that ramps it smoothly to the post-coupling target value Cap,c,v at instant t2.

Having reached the target value at instant t2, the torque setpoint for the main shaft no longer changes after that. However, if the torque setpoints for the motors have not reached their optimal values, instant t2 is followed by a period P3 ending at instant t3 during which the torque setpoints for the motors are adjusted to their optimal values.

These control laws implemented by the local computers 21, 22 and 23 under the supervision of the computer 24 make it possible to couple the two motors quickly without generating any discontinuity in the acceleration of the vehicle, and therefore without generating any longitudinal impact that is unpleasant for the passengers.

We will now explain the control method for decoupling the first motor and the second motor, with reference to FIG. 3.

In FIG. 3, we discuss the instant t'0 at which the decision is made to begin decoupling the first motor and the second motor, i.e., the instant when we begin to vary the torque setpoints of the two motors; the instant t'1 when we start opening the decoupling/decoupling means; and the instant t'2 at which decoupling/decoupling means finishes opening.

Before instant t'0, the two motors are coupled, and are driving the main shaft; the coupling/decoupling means is transmitting a torque to the main shaft that is equal to the torque of the second motor; the main shaft is driven by a torque equal to the sum of the torques provided by the two motors. After instant t'2, the two motors are decoupled and the first motor alone is driving the main shaft.

As previously, for the main shaft we define a target torque for the coupled state and a target torque for the decoupled state Cap,c,v and Cap,d,v, respectively, targeted after decoupling.

Before coupling and throughout the opening of the coupling/decoupling device, the two motors are controlled for torque. Before starting the decoupling process—i.e., before instant t'0—the target torque for the second motor is greater than the target torque for the main shaft when coupled, as shown in the figure; the torque of the first motor is less than zero, which means that it is operating as a generator, and the sum of the torques targeted for the first motor and the second motor is equal to the target torque for the main shaft when coupled.

In the automated control of the drive train, we define a torque setpoint for the main shaft that remains equal to the main shaft target torque when coupled until the instant t'2 when the coupling/decoupling means opens, and after this instant t'2, it is equal to the value of the torque setpoint of the main shaft when decoupled Cap,d,v.

During the transition phase between t'0 and t'1, we send the second motor a torque setpoint that progresses so that at instant t'1 it is equal to the difference between the target setpoint for the main shaft when coupled and the target setpoint for the main shaft when decoupled Cap,c,v−Cap,d,v.

Simultaneously, we send the first motor a torque setpoint such that the torque provided by the first motor at the instant decoupling occurs is equal to the target torque for the main shaft when decoupled at the moment decoupling occurs Cap,d,v.

At instant t'1, the coupling/decoupling means begins to open laterally, so that it is completely open at instant t'2.

After instant t'2, the second motor no longer participates in the operation of the drive unit, and this second motor can then be controlled for speed.

With these torque progression setpoints for the motors during the period when the coupling/decoupling means is opening, the result is that during the whole opening period, the setpoint for torque transmitted to the main shaft is equal to the target torque setpoint for the main shaft when coupled; and that at instant t2, when the coupling/decoupling means is completely open—which is when the second motor is effectively decoupled—the setpoint for torque to be transmitted to the main shaft experiences a discontinuity equal to the difference between the target torque setpoint for the main shaft when decoupled and the target torque setpoint for the main shaft when coupled.

This discontinuity in the setpoint for torque transmitted to the main shaft corresponds to the discontinuity needed to eliminate the effects of the discontinuity in driven inertia, and consequently, to obtain continuity in the acceleration of the vehicle.

The invention claimed is:

1. Method for controlling the coupling or the decoupling of a first motor and a second motor of a parallel hybrid drive train of the type comprising a first electric motor that drives a main shaft, a second motor, and a coupling/decoupling means for the second motor and the first motor, maneuverable between an open position and a closed position, according to which the drive train is controlled so that the rotation speed of the main shaft remains unchanged at the moment of coupling and decoupling, wherein a control law is used to control the drive train that generates a discontinuity between the torque Cap,d delivered to the main shaft when the first and second motors are decoupled and the torque Cap,c delivered to the main shaft when the first and second motors are coupled, which is selected so as to offset the difference between the inertia Jap,d carried by the main shaft when the first and second motors are decoupled and the inertia Jap,c carried by the main shaft when the first and second motors are coupled in order to maintain a continuity in the acceleration of the main shaft driven by the motor motors at the moment of coupling or decoupling.

2. Method according to claim 1, wherein if the main shaft of the drive train is subjected to a resisting torque Cap,res, then the torque discontinuity ΔC=Cap,c−Cap,d generated is such that:

$$\frac{Cap, c - Cap, res}{Jap, c} = \frac{Cap, d - Cap, res}{Jap, d}$$

Thus:

$$\Delta C = \frac{Jap, c - Jap, d}{Jap, d}(Cap, d - Cap, res)$$

3. Method according to claim 1, wherein a torque setpoint Cap,c,v is defined for the main shaft when the motors are coupled, targeted after coupling or decoupling, as well as a torque setpoint Cap,d,v for the main shaft when the motors are decoupled, targeted after coupling or decoupling, such that:

$$\frac{Cap, c, v - Cap, res}{Jap, c} = \frac{Cap, d, v - Cap, res}{Jap, d}$$

and the drive train is controlled so that, after the coupling/decoupling means maneuver, the torque delivered to the main shaft is equal to the target torque setpoint Cap,c,v or Cap,d,v for the main shaft that corresponds to the state—coupled or decoupled, respectively—of the coupling/decoupling device at the end of its maneuver.

4. Method according to claim 1, wherein the first motor is an electric motor, the second motor is a heat engine, the coupling/decoupling means is a controlled clutch, and the drive train is the drive train of an automobile.

5. Parallel hybrid drive train for propelling an automobile, comprising a first motor, a second motor, a coupling/decoupling means for the first motor and the second motor, and a control means, wherein, in order to control the coupling or the decoupling of the two motors, the control means implements the method according to claim 1.

6. Method according to claim 3, wherein when the drive train is being controlled so as to couple the first motor and the second motor, a sudden discontinuity is generated in the torque setpoint Cap,v(t) for the main shaft, which is targeted at each instant, equal to the difference between the main shaft torque setpoint Cap,d,v when the motors are decoupled and the main shaft torque setpoint Cap,c,v when the motors are coupled.

7. Method according to claim 3, wherein when controlling the decoupling of the second motor, before the coupling/decoupling means begins to open, the second motor is controlled so that the setpoint Cmot2,d for torque delivered by the second motor just before opening is equal to the difference between the target torque setpoint Cap,c,v for the main shaft if it were not decoupled and the setpoint Cap,d,v for torque delivered by the main shaft after decoupling; and the first motor is controlled for torque so that the setpoint Cmot1,v(t1) for torque delivered by the first motor at the moment the coupling/decoupling means begins to open is equal to the post-decoupling target torque setpoint Cap,d,v of the main shaft, and so that throughout decoupling, the sum of the setpoints for torque delivered by the first motor at each instant Cmot1,v(t) and the second motor at each instant Cmot2,v(t) is equal to the setpoint Cap,c,v for torque delivered to the main shaft when the motors are coupled; then the coupling/decoupling means is opened in such a way that after the coupling/decoupling means is completely open, the torque transmitted to the main shaft is equal to the post-decoupling target torque Cap,d,v.

8. Method according to claim 6, wherein the sudden discontinuity in the torque setpoint Cap,v(t) for the main shaft, which is targeted at each instant, is generated at the instant when the coupling/decoupling device reaches the closed position.

9. Method according to claim 8, wherein the coupling/decoupling device is commanded to make it change from the open position to the closed position, starting at the beginning (t0) of the period (P1) in which the coupling/decoupling device is closing, the first motor is controlled for torque so that at each instant, the sum of the setpoint Cmot1(t) for torque provided by the first motor and the setpoint Cemb(t) for torque delivered by the coupling/decoupling device is equal to the setpoint Cap,v(t) targeted at each instant for the torque delivered by the main shaft, thus: Cap,v (t)=Cmot1 (t)+Cemb(t); during the period (P1) when the coupling/decoupling device is closing, the second motor for speed is controlled so that at the moment the device closes (t1), its speed is substantially equal to the rotation speed of the main shaft; and from the instant (t1) the coupling/decoupling device closes, the second motor is controlled for torque with a setpoint Cmot2,v(t) equal to the sum of the setpoint Cemb(t) for torque delivered by the coupling/decoupling means and the difference between the post- and pre-coupling target torque setpoints for the main shaft, thus:

$$Cmot2,v(t)=Cemb(t)+Cap,c,v-Cap,d,v.$$

10. Method according to claim 9, wherein a coupling time Tempo and an optimal torque setpoint for the second motor Cmot2,*op* are defined, and the closing of the coupling/decoupling device is controlled so that the torque setpoint Cemb(t) delivered by the coupling/decoupling device varies linearly over time, so that at the end of a time equal to Tempo after the moment (t0) the coupling/decoupling means is activated, the setpoint for torque delivered by the second motor is equal to the optimal torque setpoint Cmot2,*op* for the second motor.

11. Drive train according to claim 5, wherein the control means comprises at least one computer and the control method is implemented using an appropriate computer program.

* * * * *